United States Patent
Wu

(10) Patent No.: US 9,125,230 B2
(45) Date of Patent: Sep. 1, 2015

(54) ELECTRONIC DEVICE AND METHOD FOR SWITCHING DUAL SUBSCRIBER IDENTITY MODULES

(71) Applicant: FIH (Hong Kong) Limited, Kowloon (HK)

(72) Inventor: Feng-Kuang Wu, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 14/259,289

(22) Filed: Apr. 23, 2014

(65) Prior Publication Data

US 2014/0323112 A1    Oct. 30, 2014

(30) Foreign Application Priority Data

Apr. 29, 2013    (TW) .............................. 102115201 A

(51) Int. Cl.
*H04W 88/06* (2009.01)
*H04W 8/18* (2009.01)
*H04W 68/02* (2009.01)

(52) U.S. Cl.
CPC .............. *H04W 88/06* (2013.01); *H04W 8/183* (2013.01); *H04W 68/02* (2013.01)

(58) Field of Classification Search
CPC ..... H04W 88/06; H04W 68/02; H04W 8/183; H04W 8/18
See application file for complete search history.

(56) References Cited

U.S. PATENT DOCUMENTS

| 2009/0286522 | A1* | 11/2009 | Lee ................................ 455/416 |
| 2012/0058748 | A1* | 3/2012 | Jeung et al. ................ 455/414.1 |
| 2014/0274006 | A1* | 9/2014 | Mutya et al. .................. 455/416 |

* cited by examiner

*Primary Examiner* — Chuong A Ngo
(74) *Attorney, Agent, or Firm* — Novak Druce Connolly Bove + Quigg LLP

(57) ABSTRACT

Method of switching dual subscriber identity modules (SIMs) of an electronic device includes predetermining a number of sequences. Each of the sequences represents a combination of a number NUM1 of a first state value, and a number NUM2 of a second state value. The first state value represents that the SIM is available, and the second state value represents that the SIM is unavailable. When a connected base station transfers a phone call to the SIM of the electronic device and the connected base station is not the default base station, a probability of missing the phone call of the SIM with each of the sequences is calculated. Based on the calculated probabilities, an optimized sequence is determined. The optimized sequence has a minimum probability and corresponds to a maximum ratio of NUM2 to NUM1. According to the optimized sequence, a standby time of the electronic device is divided.

18 Claims, 7 Drawing Sheets

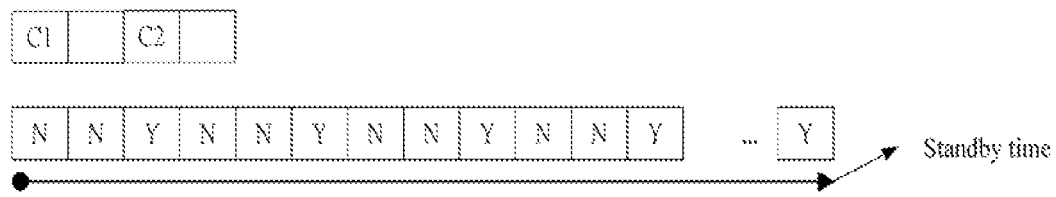
FIG.5-A

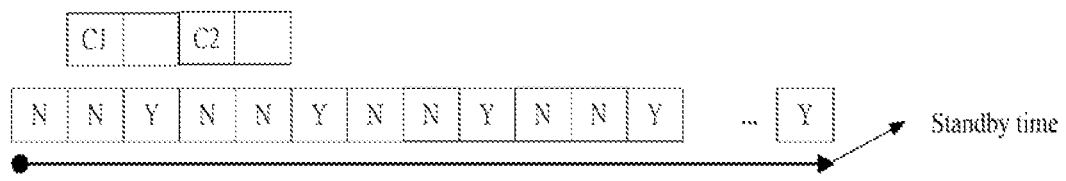
FIG.5-B

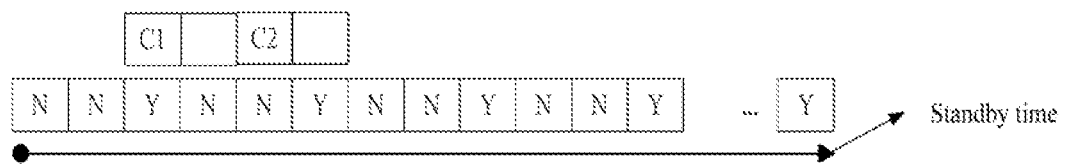
FIG.5-C

ELECTRONIC DEVICE AND METHOD FOR SWITCHING DUAL SUBSCRIBER IDENTITY MODULES

FIELD

Embodiments of the present disclosure relate to dual subscriber identity modules (SIMs) and dual standby (DSDS) technology, and particularly to an electronic device and a method for switching dual SIMs.

BACKGROUND

An electronic device may include dual SIMs, which include a first SIM and a second SIM. When a call is established using one SIM, the other SIM is inactive. For example, if the second SIM is being used to transmit data when a phone call for the first SIM arrives at the electronic device, the first SIM is unavailable for receiving the phone call. Therefore, the second SIM needs to stop transmitting data, and the electronic device is controlled to switch from the second SIM to the first SIM to receive the phone call. However, if the electronic device spends too much time to switch from the second SIM to the first SIM, it will result in that data transmission of the second SIM is discontinuous. If the electronic device spends too little time to switch from the second SIM to the first SIM, it will result in that the first SIM cannot receive the phone call.

BRIEF DESCRIPTION OF THE DRAWINGS

FIGS. 5-A to 5-C illustrate one example of calculating a probability of missing a phone call of a SIM with a specific sequence.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
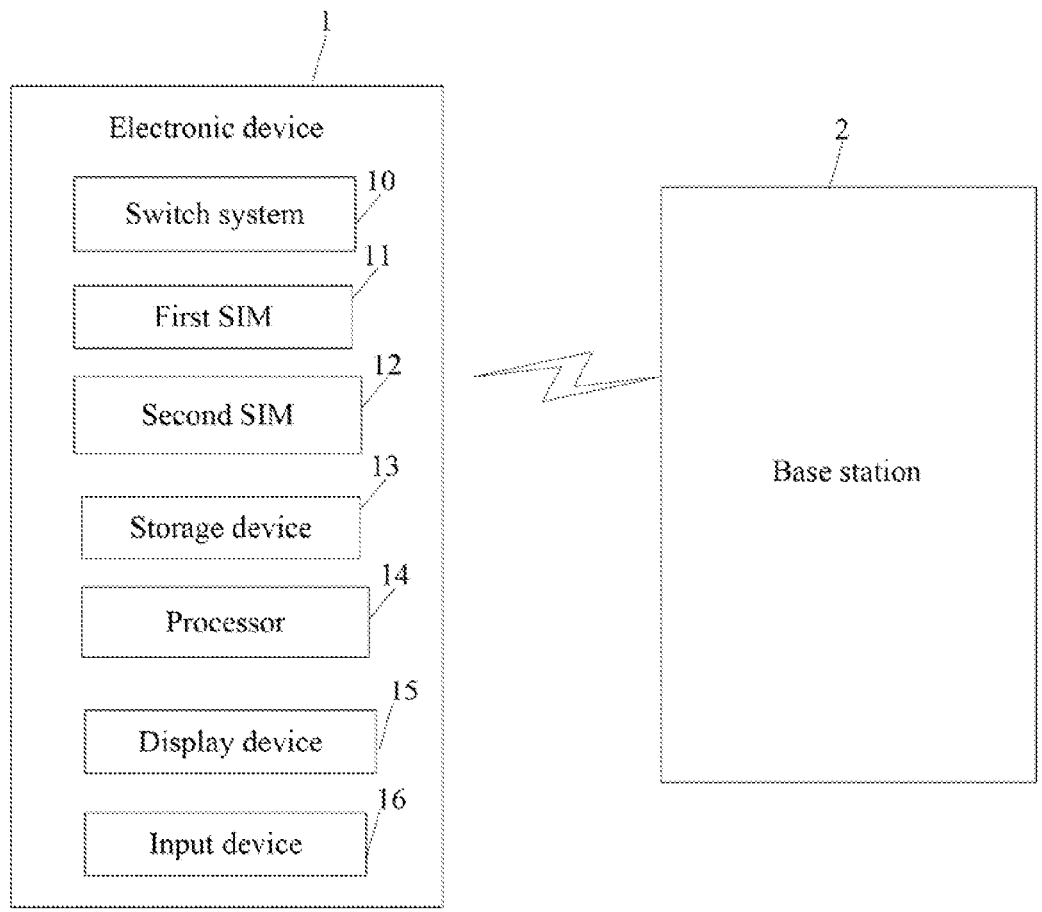
FIG. 1 is a block diagram of one embodiment of an electronic device including a switch system.

FIG. 1 is a block diagram of one embodiment of an electronic device 1 including a switch system 10 (hereinafter "the system 10"), a first subscriber identity module (SIM) 11, and a second SIM 12. When a phone call or data transmission is established using the first SIM, the second SIM is inactive. When a phone call or data transmission is established using the second SIM, the first SIM is inactive. The electronic device 1 further includes a storage device 13, at least one processor 14, a display device 15, and an input device 16. The electronic device 1 may be a computer, a smart phone, a personal digital assistant (PDA), or other suitable electronic device. It should be understood that FIG. 1 illustrates only one example of the electronic device 1 that may include more or fewer components than illustrated, or have a different configuration of the various components in other embodiments.

The electronic device 1 can be connected to a base station 2. The base station 2 is also connected to other electronic devices. The other electronic devices may have dual SIMs or a single SIM. Each of the other electronic devices may be a computer, a smart phone, a PDA, or other suitable electronic device. The base station 2 is a public mobile base station. When another user of another electronic device makes a phone call to a user of the electronic device 1, the another electronic device first connects to the base station 2, and then the base station 2 transfers the phone call to the electronic device 1. The phone call transferred by the base station 2 includes a plurality of paging requests. There is a time interval between each two adjacent paging requests.

The system 10 can switch between the first SIM 11 and the second SIM 12 to ensure that one SIM can receive an incoming call while the other SIM has a good speed for transmitting data when the incoming call is transferred to the electronic device 1.

In at least one embodiment, the storage device 13 may include various types of non-transitory computer-readable storage medium, such as a hard disk, a compact disc, a digital video disc, or a tape drive. The display device 15 may display images and videos, and the input device 16 may be a mouse or a keyboard to input computer-readable data.

Figure 2:
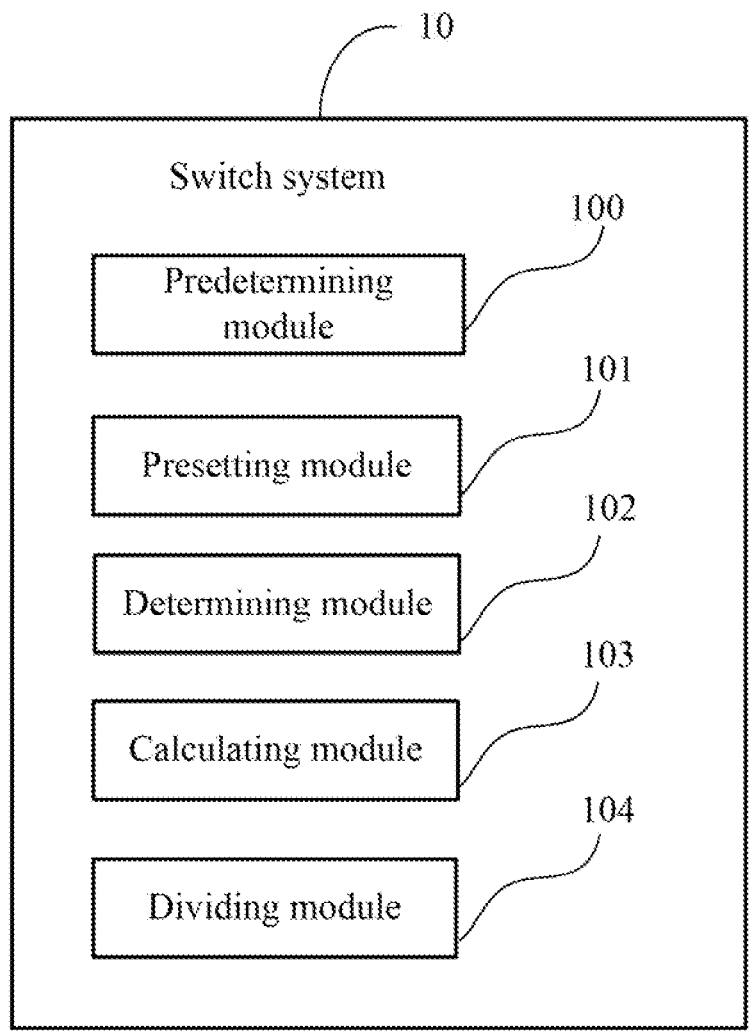
FIG. 2 is a block diagram of one embodiment of function modules of the switch system in the electronic device of FIG. 1.

FIG. 2 is a block diagram of one embodiment of function modules of the system 10. In at least one embodiment, the system 10 may include a predetermining module 100, a presetting module 101, a determining module 102, a calculating module 103, and a dividing module 104. The function modules 100-104 may include computerized codes in the form of one or more programs, which are stored in the storage device 13. The at least one processor 14 executes the computerized codes to provide functions of the function modules 100-104. A detailed description of the function modules 100-104 is given in reference to FIG. 3.

Figure 3:
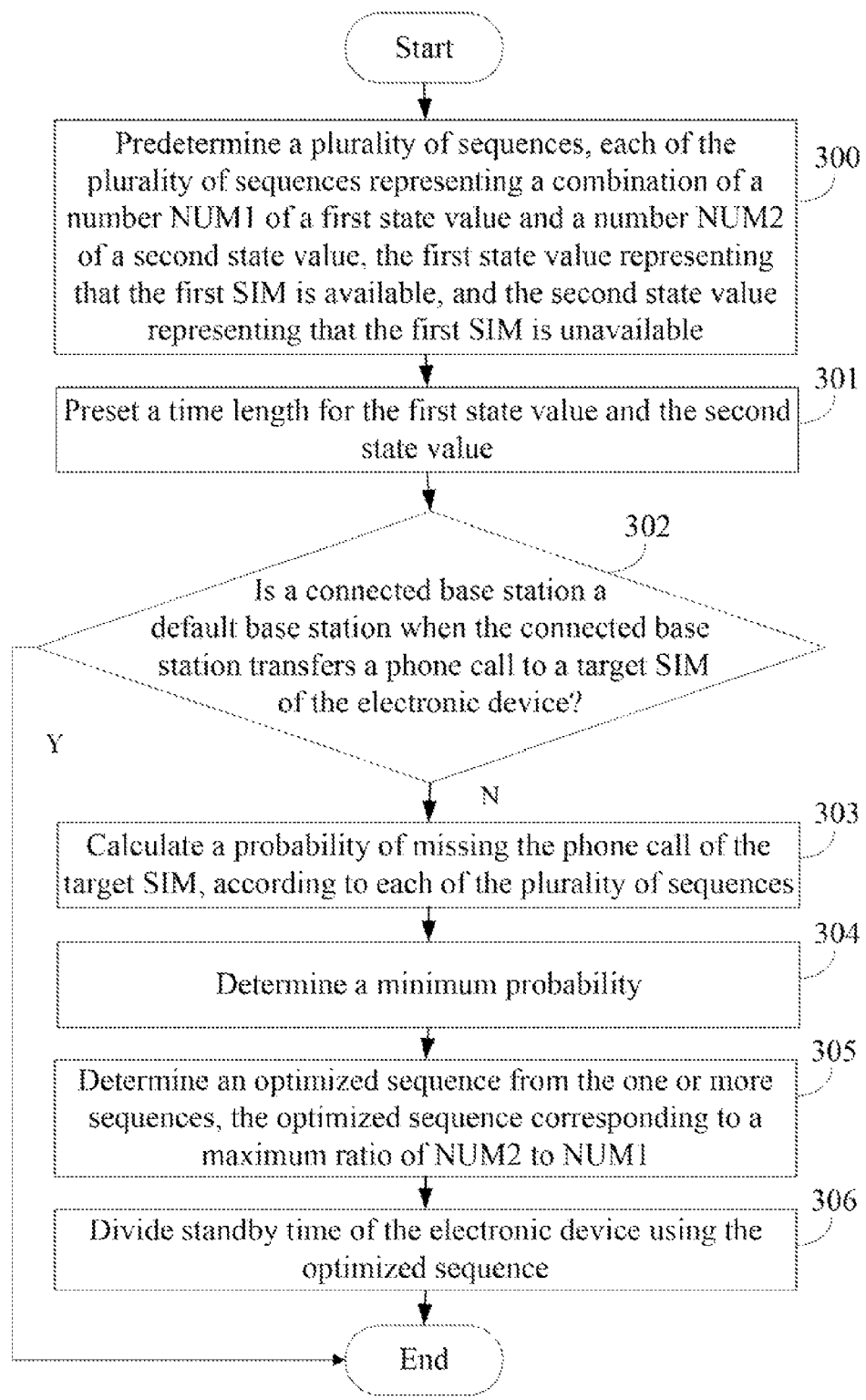
FIG. 3 illustrates a flowchart of one embodiment of a method for switching dual SIMs in the electronic device of FIG. 1.

FIG. 3 illustrates a flowchart of one embodiment of a method for switching dual SIMs in the electronic device 1 of FIG. 1. Depending on the embodiment, additional steps may be added, others removed, and the ordering of the steps may be changed.

In 300, the predetermining module 100 predetermines a plurality of sequences. Each of the sequences represents a combination of a number NUM1 of a first state value, and a number NUM2 of a second state value. The first state value represents that the first SIM 11 is available for receiving phone calls and the second SIM 12 is inactive. The second state value represents that the first SIM 11 is unavailable for receiving phone calls and the second SIM 12 is active.

Figure 4:
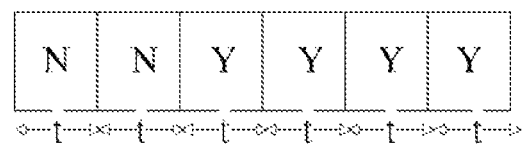
FIG. 4 is a schematic diagram of a sequence.

In 301, the presetting module 101 presets a time length (e.g., 30 milliseconds (ms)) for the first state value and the second state value. As shown in FIG. 4, "Y" represents the first state value, "N" represents the second state value, and the illustrated sequence is "NNYYYY." Each "Y" and "N" has a time length "t."

In 302, when the base station 2 connected to the electronic device 1 (hereinafter, the base station 2 is referred to as "the connected base station 2") transfers a phone call to a SIM (e.g., the first SIM 11 or the second SIM 12) of the electronic device 1, the determining module 102 determines whether the connected base station 2 is a default base station. When the connected base station 2 is not the default base station, the procedure goes to 303. When the connected base station 2 is the default base station, the procedure ends. The default base station is predetermined, and related information of the default base station is stored in the storage device 13. In at least one embodiment, the storage device 13 also stores a default number of paging request times and a default time interval of each adjacent two paging requests corresponding to the default base station.

In at least one embodiment, when the connected base station 2 transfers the phone call to the electronic device 1 while the connected base station 2 is connected to other electronic devices through an Internet, the determining module 102 acquires paging request times and a time interval of each adjacent two paging requests corresponding to each of the other electronic devices from the Internet. Based on all the acquired paging request times and all the acquired time intervals of the adjacent paging requests, the determining module 102 determines a greatest number of paging request times and a longest time interval of adjacent paging requests. When the greatest number of paging request times is not equal to the default paging request times corresponding to the default base station, or the longest time interval of the adjacent paging requests is not equal to the default time interval of the adjacent paging requests corresponding to the default base station, the determining module 102 determines that the connected base station 2 is not the default base station. When the greatest number of the paging request times is equal to the number of default paging request times corresponding to the default base station, and/or the longest time interval of the adjacent paging requests is equal to the default time interval of the adjacent paging requests corresponding to the default base station, the determining module 102 determines that the connected base station 2 is the default base station of the electronic device 1.

When the connected base station 2 is not the default base station of the electronic device 1, the determining module 102 removes the default base station and the corresponding default number of paging request times and the default time interval of the adjacent paging requests from the storage device 13. Then, the determining module 102 sets the connected base station 2 as the default base station. The determining module 102 stores paging request times and a time interval of the adjacent paging requests corresponding to the connected base station 2 in the storage device 13.

In 303, the connected base station 2 transfers the phone call to a target SIM (e.g., the first SIM 11 or the second SIM 12) of the electronic device 1. The calculating module 103 calculates a probability of the target SIM missing the phone call according to each of the plurality of sequences.

In at least one embodiment, the calculating module 103 calculates the probability of the target SIM missing the phone call based on each of the sequences by dividing times of missing the phone call of the target SIM corresponding to each of the sequences by a sum of (NUM1+NUM2). The sum of (NUM1+NUM2) represents a summation of a first situation that the target SIM is available to receive the phone call and a second situation that the target SIM is unavailable to receive the phone call when the phone call arrives at the electronic device 1. The times of missing the phone call of the target SIM corresponding to each of the sequences is equal to a number of the second situation corresponding to each of the sequences.

When the connected base station 2 transfers the phone call to the target SIM, the phone call includes a plurality of paging requests. When one of the paging requests arrives at the electronic device 1 when the target SIM is active, the target SIM is available to receive the phone call. If the target SIM is inactive when each of the paging requests arrives at the electronic device 1, the target SIM misses the phone call.

For example, as shown in FIG. 5-A, FIG. 5-B, and FIG. 5-C, it is assumed that a phone call to the first SIM 11 transferred by the connected base station 2 includes two paging requests, such as a first paging request "C1" and a second paging request "C2." A sequence is "NNY," in which "N" represents that the first SIM 11 is not active, and "Y" represents that the first SIM 11 is active. A standby time of the electronic device 1 is divided based on the sequence. Therefore, NUM1 is equal to "1" and NUM2 is equal to "2."

For a first example, as shown in FIG. 5-A, when the paging request "C1" arrives at the electronic device 1, the first SIM 11 is inactive, and when the paging request "C2" arrives at the electronic device 1, the first SIM 11 is active. Therefore, in FIG. 5-A, the first SIM 11 can receive the phone call. For a second example, as shown in FIG. 5-B, when the paging request "C1" arrives at the electronic device 1, the first SIM 11 is inactive, and when the paging request "C2" arrives at the electronic device 1, the first SIM 11 is also inactive. Therefore, in FIG. 5-B, the first SIM 11 cannot receive the phone call. For a third example, as shown in FIG. 5-C, when the paging request "C1" arrives at the electronic device 1, the first SIM 11 is active, and when the paging request "C2" arrives at the electronic device 1, the first SIM 11 is inactive. Therefore, in FIG. 5-C, the first SIM 11 can receive the phone call. Accordingly, based on these examples, a number of the first situation is "2," and a number of the second situation is "1." The probability of missing the phone call of the first SIM 11 with the sequence is "1/(2+1)," or "⅓."

In 304, the determining module 102 determines a minimum probability among a plurality of calculated probabilities with each of the plurality of sequences. Based on the minimum probability, the determining module 102 determines one or more sequences corresponding to the minimum probability. In some embodiments, the minimum probability is equal to zero.

In 305, the determining module 102 determines an optimized sequence from the one or more sequences. The optimized sequence corresponds to a maximum ratio of "NUM2/NUM1."

In 306, the dividing module divides the standby time of the electronic device 1 using the optimized sequence. For example, as shown in FIG. 5-C, an optimized sequence is "NNY," and each "N" and "Y" has a time length of 5 seconds (s). If the time length of the standby time of the electronic device 1 is 25 s, the dividing module 104 divides the standby time into five optimized sequences.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A computerized dual subscriber identity modules (SIMS) switching method being executed by at least one processor of an electronic device, the electronic device comprising a first SIM and a second SIM, the method comprising:

predetermining a plurality of sequences, each of the plurality of sequences representing a combination of a number NUM1 of a first state value and a number NUM2 of a second state value, the first state value representing that the first SIM is available, and the second state value representing that the first SIM is unavailable;

presetting a time length for the first state value and the second state value;

determining whether a connected base station of the electronic device is a default base station when the connected base station transfers a phone call to a target SIM of the electronic device;

calculating a probability of missing the phone call of the target SIM, according to each of the plurality of sequences, when the connected base station is not the default base station;

determining a minimum probability, and determining one or more sequences corresponding to the minimum probability;

determining an optimized sequence from the one or more sequences, the optimized sequence corresponding to a maximum ratio of NUM2 to NUM1; and dividing standby time of the electronic device using the optimized sequence.

2. The method according to claim 1, wherein the step of determining whether the connected base station of the electronic device is the default base station comprises:

when the connected base station transfers the phone call to the electronic device and the connected base station is connected to other electronic devices, acquiring paging request times and a time interval of adjacent paging requests corresponding to each of the other electronic devices;

determining a greatest number of paging request times, and a longest time interval of adjacent paging requests;

determining that the connected base station is not the default base station of the electronic device when the greatest number of the paging request times is not equal to a default paging request times corresponding to the default base station, or the longest time interval of the adjacent paging requests is not equal to a default time interval of the adjacent paging requests corresponding to the default base station.

3. The method according to claim 2, further comprising:

deleting the default base station, the default number of the paging request times and the default time interval of the adjacent paging requests corresponding to the default base station, setting the connected base station to be an updated default base station, and storing paging request times and a time interval of the adjacent paging requests corresponding to the connected base station.

4. The method according to claim 1, wherein the probability of missing the phone call of the target SIM based on each of the plurality of sequences is calculated by dividing times of missing the phone call of the target SIM corresponding to each of the plurality of sequences by a sum of (NUM1+NUM2).

5. The method according to claim 4, wherein the sum of (NUM1+NUM2) represents a summation of a first situation that the target SIM is available to receive the phone call and a second situation that the target SIM is unavailable to receive the phone call when the phone call arrives at the electronic device.

6. The method according to claim 1, wherein the minimum probability is zero.

7. An electronic device, comprising:

a processor; and a storage device that stores one or more programs, when executed by the at least one processor, cause the at least one processor to perform a switching method, the electronic device comprising a first subscriber identity modules (SIM) and a second SIM, the method comprising:

predetermining a plurality of sequences, each of the plurality of sequences representing a combination of a number NUM1 of a first state value and a number NUM2 of a second state value, the first state value representing that the first SIM is available, and the second state value representing that the first SIM is unavailable;

presetting a time length for the first state value and the second state value;

determining whether a connected base station of the electronic device is a default base station when the connected base station transfers a phone call to a target SIM of the electronic device;

calculating a probability of missing the phone call of the target SIM, according to each of the plurality of sequences, when the connected base station is not the default base station;

determining a minimum probability, and determining one or more sequences corresponding to the minimum probability;

determining an optimized sequence from the one or more sequences, the optimized sequence corresponding to a maximum ratio of NUM2 to NUM1; and dividing standby time of the electronic device using the optimized sequence.

8. The electronic device according to claim 7, wherein the step of determining whether the connected base station of the electronic device is the default base station comprises:

when the connected base station transfers the phone call to the electronic device and the connected base station is connected to other electronic devices, acquiring paging request times and a time interval of adjacent paging requests corresponding to each of the other electronic devices;

determining a greatest number of paging request times, and a longest time interval of adjacent paging requests;

determining that the connected base station is not the default base station of the electronic device when the greatest number of the paging request times is not equal to a default paging request times corresponding to the default base station, or the longest time interval of the adjacent paging requests is not equal to a default time interval of the adjacent paging requests corresponding to the default base station.

9. The electronic device according to claim 8, wherein the method further comprises:

deleting the default base station, the default number of the paging request times and the default time interval of the adjacent paging requests corresponding to the default base station, setting the connected base station to be an updated default base station, and storing paging request times and a time interval of the adjacent paging requests corresponding to the connected base station.

10. The electronic device according to claim 7, wherein the probability of missing the phone call of the target SIM based on each of the plurality of sequences is calculated by dividing times of missing the phone call of the target SIM corresponding to each of the plurality of sequences by a sum of (NUM1+NUM2).

11. The electronic device according to claim 10, wherein the sum of (NUM1+NUM2) represents a summation of a first situation that the target SIM is available to receive the phone call and a second situation that the target SIM is unavailable to receive the phone call when the phone call arrives at the electronic device.

12. The electronic device according to claim 7, wherein the minimum probability is zero.

13. A non-transitory storage medium having stored thereon instructions that, when executed by a processor of an electronic device, the electronic device comprising a first subscriber identity modules (SIM) and a second SIM, causes the processor to perform a switching method in the electronic device, wherein the method comprises:

predetermining a plurality of sequences, each of the plurality of sequences representing a combination of a number NUM1 of a first state value and a number NUM2 of a second state value, the first state value representing that the first SIM is available, and the second state value representing that the first SIM is unavailable;

presetting a time length for the first state value and the second state value;

determining whether a connected base station of the electronic device is a default base station when the connected base station transfers a phone call to a target SIM of the electronic device;

calculating a probability of missing the phone call of the target SIM, according to each of the plurality of sequences, when the connected base station is not the default base station;

determining a minimum probability, and determining one or more sequences corresponding to the minimum probability;

determining an optimized sequence from the one or more sequences, the optimized sequence corresponding to a maximum ratio of NUM2 to NUM1; and dividing standby time of the electronic device using the optimized sequence.

14. The non-transitory storage medium according to claim 13, wherein the step of determining whether the connected base station of the electronic device is the default base station comprises:

when the connected base station transfers the phone call to the electronic device and the connected base station is connected to other electronic devices, acquiring paging request times and a time interval of adjacent paging requests corresponding to each of the other electronic devices;

determining a greatest number of paging request times, and a longest time interval of adjacent paging requests;

determining that the connected base station is not the default base station of the electronic device when the greatest number of the paging request times is not equal to a default paging request times corresponding to the default base station, or the longest time interval of the adjacent paging requests is not equal to a default time interval of the adjacent paging requests corresponding to the default base station.

15. The non-transitory storage medium according to claim 14, wherein the method further comprises:

deleting the default base station, the default number of the paging request times and the default time interval of the adjacent paging requests corresponding to the default base station, storing paging request times and a time interval of the adjacent paging requests corresponding to the connected base station.

16. The non-transitory storage medium according to claim 13, wherein the probability of missing the phone call of the target SIM based on each of the plurality of sequences is calculated by dividing times of missing the phone call of the target SIM corresponding to each of the plurality of sequences by a sum of (NUM1+NUM2).

17. The non-transitory storage medium according to claim 16, wherein the sum of (NUM1+NUM2) represents a summation of a first situation that the target SIM is available to receive the phone call and a second situation that the target SIM is unavailable to receive the phone call when the phone call arrives at the electronic device.

18. The non-transitory storage medium according to claim 13, wherein the minimum probability is zero.

* * * * *